Figure 4:
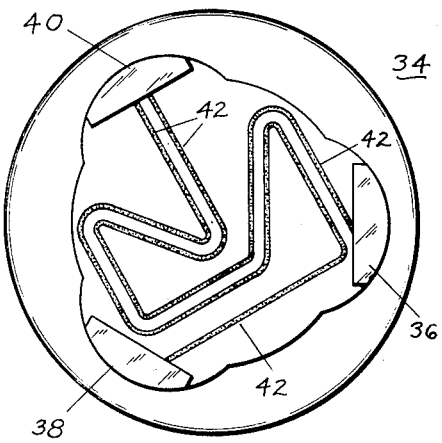

Feb. 26, 1957 W. B. READEY 2,783,357
CONTAINERS THAT KEEP MATERIALS WARM
Filed March 31, 1952 4 Sheets-Sheet 1

INVENTOR.
William B. Readey
BY
Rey Eilers
ATTORNEY

Feb. 26, 1957 W. B. READEY 2,783,357
CONTAINERS THAT KEEP MATERIALS WARM
Filed March 31, 1952 4 Sheets-Sheet 2

INVENTOR.
William B. Readey
BY
Rey Eilers
ATTORNEY

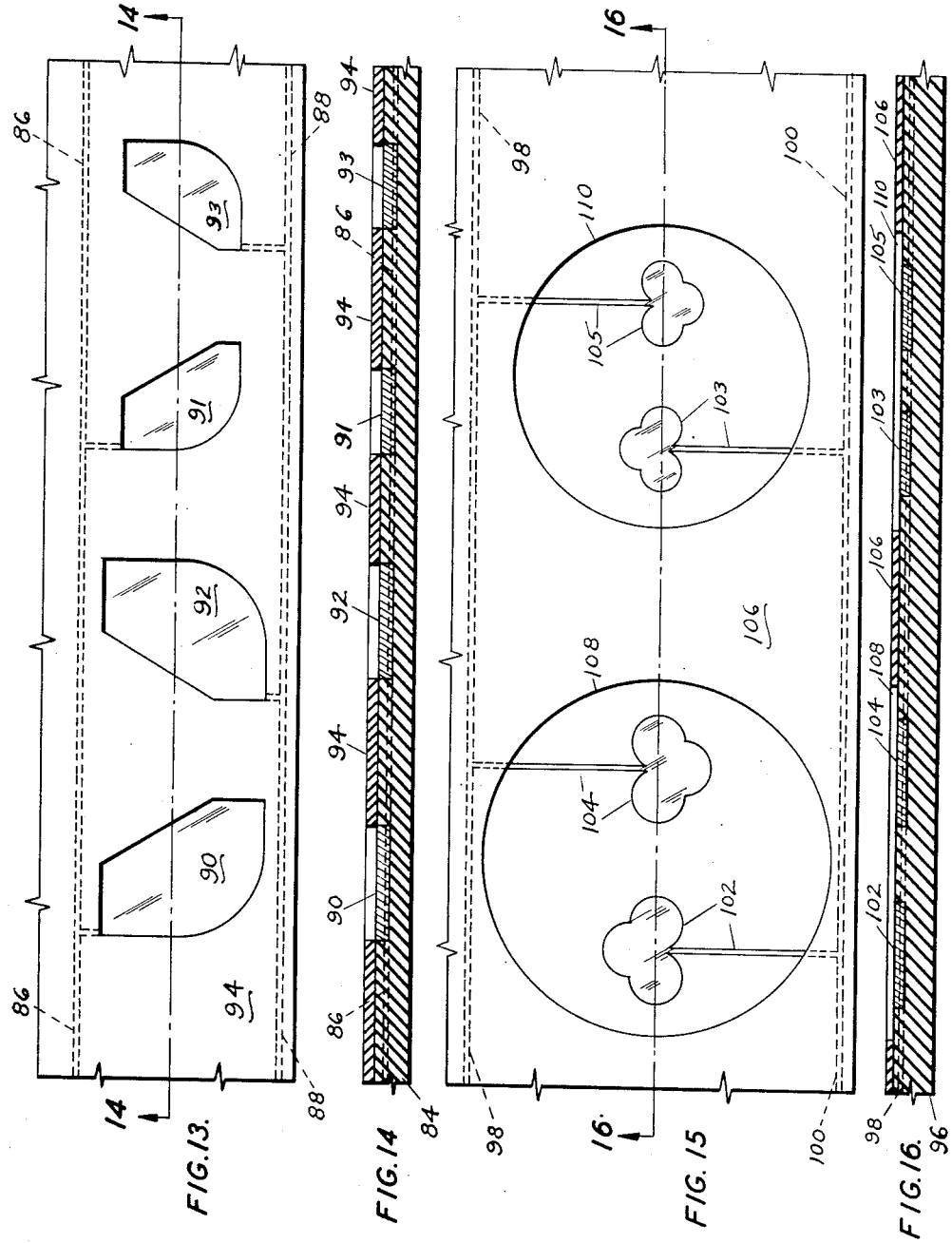

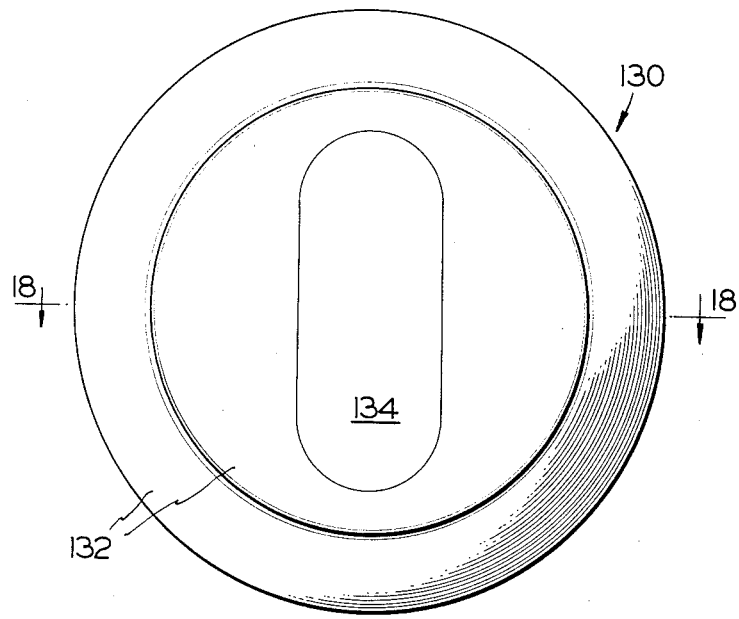
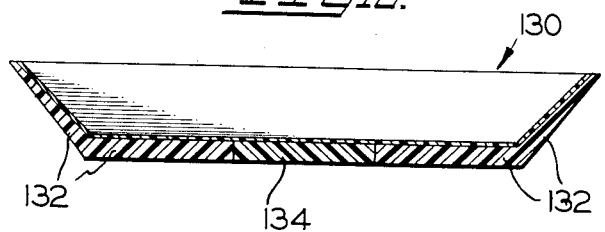

United States Patent Office 2,783,357
Patented Feb. 26, 1957

2,783,357

CONTAINERS THAT KEEP MATERIALS WARM

William B. Readey, Brentwood, Mo.

Application March 31, 1952, Serial No. 279,594

6 Claims. (Cl. 219—43)

This invention relates to improvements in "Containers That Keep Materials Warm." More particularly this invention relates to improvements in containers which can be used at the table to keep materials warm during meals.

It is therefore an object of the present invention to provide an improved container that can be used at the table to keep materials warm during a meal.

In the cooking and serving of food, it is usually desirable to have the cooked foods warm or hot when they are placed on the table. If the consumers of the food reach the table at the same time the food reaches the table, and if those consumers eat the food promptly, the food will remain warm or hot. However, if the consumers reach the table after the food has reached the table, or if they do not eat the food promptly, the food can become progressively less warm or hot and can often become unpalatably cool. This of course is objectionable. The present invention obviates this objection by providing a container which can be used at the table to keep the food warm. This container will not have cords or wires extending from it which would be unsightly which could interfere with free movement around the table. Instead, that container will be registerable with spaced conductors on the table and will respond to current from those conductors to heat itself and keep the food warm. With such a container, the consumers of the food can be late in arriving at the table and can be as leisurely in eating that food as they desired, and still have the food warm or hot. It is therefore an object of the present invention to provide a container which is registerable with spaced conductors on a table to heat itself and keep the food thereon warm.

The spaced conductors on the table will be exposed to the bottom of the container and will transmit current to terminals on the bottom of that container. However, these exposed conductors will not injure or even mildly shock the persons at the table because only a low voltage will be impressed upon those conductors. The container will be made so it can respond to low voltages to provide the necessary heat. It is therefore an object of the present invention to provide a container which can be placed in register with spaced, low voltage conductors to generate heat and keep food warm.

The table will preferably have an overlying layer of insulating material which will extend above the level of the spaced conductors. Such a layer of insulation will isolate the ordinary table utensils from the conductors and keep those utensils from providing a short circuiting path between the conductors. It is therefore an object of the present invention to provide a layer of insulating material that will extend above the spaced conductors and will isolate those conductors from the ordinary table utensils.

The container provided by the present invention will have three spaced terminals, and those terminals will be connected to the ends and to a point intermediate the ends of an electrically resistive path on the container. By placing two of the terminals in register with the spaced conductors, it is possible to obtain one rate of heating for the food on the container, and by placing another pair of the terminals in register with the spaced conductors, it is possible to obtain another rate of heating, and by placing the third pair of terminals in register with the spaced conductors, it is possible to obtain still another rate of heating. In this way, the user of the container provided by the present invention is enabled to attain the desired degree of warmth in his food. It is therefore an object of the present invention to provide a container for food which has three spaced terminals that are connected to the ends and to a point intermediate the ends of an electrically resistive path on that container.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purposes of illustration only and do not limit the invention and that the invention will be defined by the appended claims.

Figure 1:
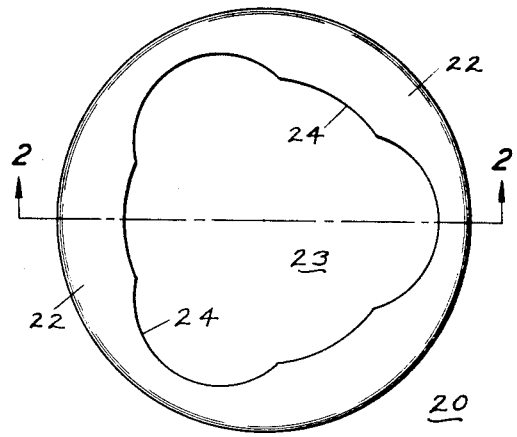
Figure 5:
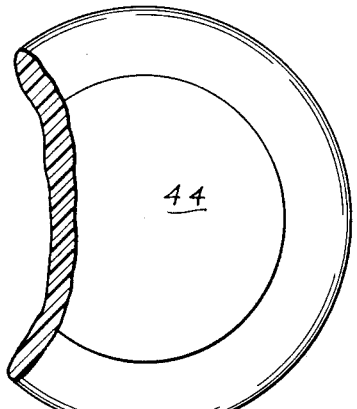
Figure 2:
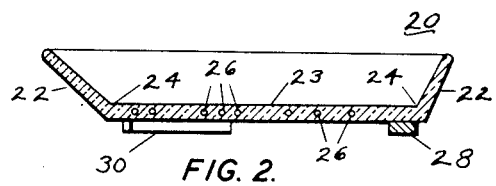
Figure 6:
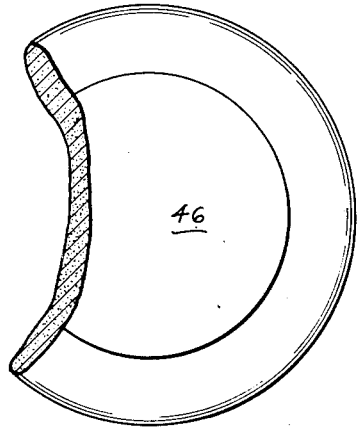
Figure 3:
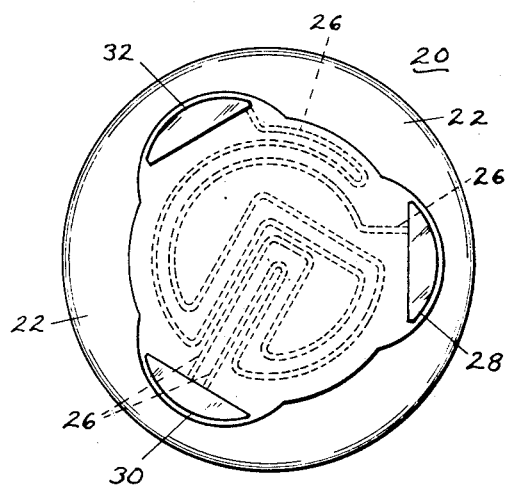
Figure 7:
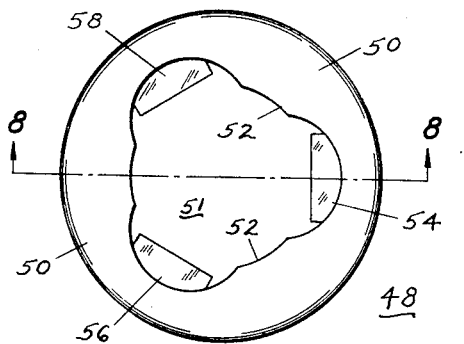
Figure 11:
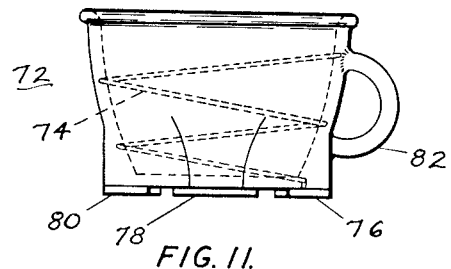
Figure 8:
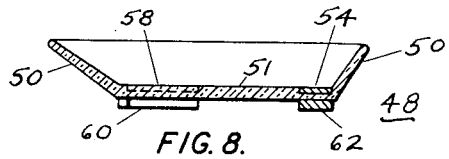
Figure 12:
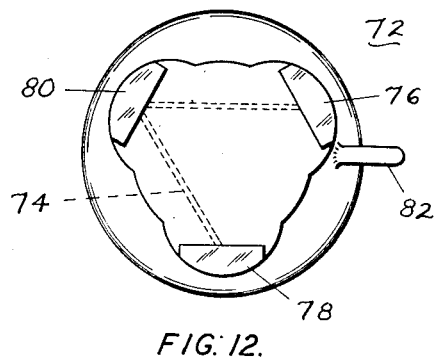
Figure 9:
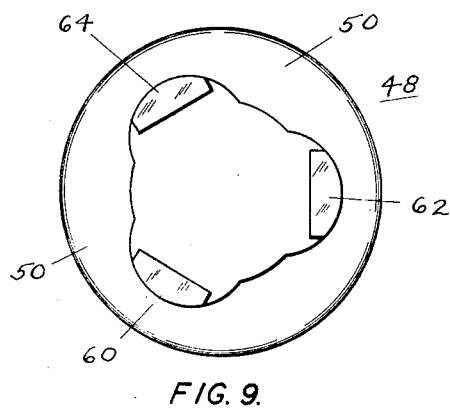
Figure 10:
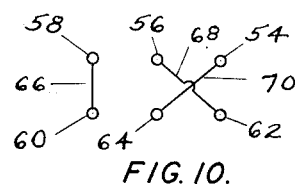

In the drawing Fig. 1 is a plan view of a container which is made in accordance with the principles and teachings of the present invention, Fig. 2 is a cross-sectional side elevational view of the container of Fig. 1 and it is taken along the plane indicated by the line 2—2 in Fig. 1, Fig. 3 is a bottom view of the container of Figs. 1 and 2, and it indicates by dotted lines the electrically resistive path in that container, Fig. 4 is a bottom view of another container which is similar to the container of Figs. 1-3 but which has the electrically resistive path formed on the bottom thereof, Fig. 5 is a partially broken away plan view of a container made of semi-conductive plastic, Fig. 6 is a plan view of a container which is made of a ceramic material in which are imbedded particles of conductive material, Fig. 7 is a plan view of a service plate, such as a saucer, which can be used with a container such as a cup, Fig. 8 is a cross-sectional side elevational view of the service plate of Fig. 7, and it is taken along the plane indicated by the line 8—8 of Fig. 7, Fig. 9 is a bottom view of the service plate of Figs. 7 and 8, Fig. 10 is a view of the electrical connection between the terminals on the top of the service plate of Figs. 7–9 and the terminals on the bottom of that service plate, Fig. 11 is a side elevational view of a container which can be used with the service plate of Figs. 7–9, Fig. 12 is a bottom view of the container of Fig. 11, and it indicates schematically by dotted lines the electrically resistive path of that container, Fig. 13 is a plan view of a portion of a table embodying the principles and teachings of the present invention, Fig. 14 is a cross-sectional side elevational view of the table of Fig. 13, Fig. 15 is a plan view of a portion of another table, Fig. 16 is a cross sectional side elevational view of the table of Fig. 15, Fig. 17 is a bottom view of a container made of two semi-conductive materials of different resistances, and Fig. 18 is a cross sectional view of the container of Fig. 17, and it is taken along the plane indicated by the line 18—18.

Referring to the drawing in detail the numeral 20 generally denotes a container such as a dinner plate. This container has upstanding sides 22 to confine foods placed on that container, but those sides vary in their inclination. In doing so, they provide a container which has varying degrees of concavity; the degree of concavity being quite sharp at some points and being relatively shallow at other points, as seen particularly in Fig. 2. The upstanding sides 22 of the container coact with the material-supporting surface 23 of the container 20 to define a cusped line 24 which consists of a number of contiguous arcs. That cusped line closely approaches the periphery of the container 20 at three points, and at those three points the concavity of the container 20 is quite sharp. At other points, the cusped line 24 extends inwardly of the periphery a good distance and at such points the concavity of the container 20 is relatively mild.

An electrically resistive path 26 is formed within the body of the container 20, and that path has the form of an elongated length of resistive wire, such as Nichrome wire. One end of the electrically resistive path 26 is secured to a terminal 28 which projects downwardly from the container 20; and that electrically resistive path extends in a tortuous manner through the body of the container 20 to the terminal 30 which also extends downwardly from the container 20. The electrically resistive path 26 continues from the terminal 30 in a tortuous manner through the body of the container 20 to the terminal 32 which extends downwardly from the container 20. The terminals 28, 30 and 32 are in register with those portions of the cusped line 24 which extend closest to the periphery of the container 20. This is desirable because the terminals 28, 30 and 32 will constitute three spaced points of support and the disposition of those terminals immediately adjacent the periphery of the container 20 will assure against tipping or tilting of the container 20 during the course of the meal. If the terminals 28, 30 and 32 were spaced an appreciable distance inwardly from the periphery of the container 20, it might be possible for downward pressure by a utensil on the material-supporting surface 23 to cause tilting of the container 20. The terminals 28, 30 and 32 constitute a part of the bottom of the container 20; that bottom being aplanar. The terminals will extend downwardly below the plane which is defined by the rest of the bottom of the container 20 and will thus be able to engage spaced conductors on a table.

The upstanding side walls 22 of the container 20 flare outwardly and facilitate the "nesting" of a number of such containers together. To "nest" such containers, it is only necessary to place the terminals 28, 30 and 32 in register with those portions of the cusped line 24 that are most closely adjacent the periphery of the container 20. The portions of the electrically resistive path 26 between the terminals 28 and 30 will have different resistance than will the portions of the resistive path 26 between the terminals 30 and 32. Thus, by placing the terminals 28 and 30 across two spaced conductors of a given voltage, it is possible to obtain one quantity of heat, to place the terminals 30 and 32 across those conductors it is possible to obtain a second and different quantity of heat, and by placing the terminals 28 and 32 across the spaced conductors it is possible to obtain a third and still different quantity of heat. In this way, the user of the container 20 is able to select the temperature of the food on the container 20.

The numeral 34 generally denotes another form of container that is made in accordance with the principles and teachings of the present invention. This container is very similar to the container 20, but instead of having the electrically resistive path imbedded within the body of the container, it is formed on the surface of the bottom of that container. That electrically resistive path is denoted by the numeral 42 and it is formed on the bottom of the container 34 by painting a layer of conductive material on that bottom and then baking the layer on to that bottom. For example, a suspension of silver in a binder can be painted on the bottom of the container 34 and then heated to harden the binder. The electrically resistive path extends from a terminal 36 to a terminal 40 and from the terminal 40 to the terminal 38. The terminal 36 will correspond to the terminal 28 of container 20, the terminal 40 will correspond to the terminal 30 of container 20, and the terminal 38 will correspond to the terminal 32 of container 20. By placing appropriate pairs of the terminals 36, 38 and 40 across two spaced conductors, it will be possible to obtain selective heating of the contents of the container 34. As is the case of terminals 28, 30 and 32 of the container 20, the terminals 36, 38 and 40 of container 34 form a part of the bottom of the container but extend below the plane of that bottom.

The numeral 44 generally denotes another form of container provided by the present invention. This container is made of a semi-conductive plastic material. Such a material will respond to the passage of current therethrough to generate heat and warm the contents supported by that container. It will be possible to attain selective heating of the contents of the container by varying the contact area in engagement with the spaced conductors. For only limited heating, the container 44 would be disposed relative to the spaced conductors so one of the conductors was just tangent to the bottom of the container 44 and so the other conductor underlies that bottom. For more complete heating, the container 44 would be set over the conductors so both conductors have equal areas thereof contacted by the container 44.

Selective heating of the contents of a semi-conductive container could also be attained by making the container of two semi-conductive materials of different resistances; and such a container is denoted by the numeral 130. The container 130 has an outer portion 132 of semi-conductive plastic which has a predetermined resistivity, and has an inner portion 134 of semi-conductive plastic which has a different resistivity. It is possible to attain selective heating of the contents of container 130 by setting the line of division between the two portions 132 and 134 of container at varying angles to the axis of the spaced conductors. Such variation in the disposition of the container 130 would vary the total overall path through the differently resistive portions 132 and 144 of the container 130. A thin insulating layer, preferably of taste-free plastic material, is provided on the upper surfaces of the portions 132 and 134 of container 130 to keep the contents of said container from providing short-circuiting paths.

The upper surface of the container 44 will be coated with a thin insulating layer 45, preferably of taste-free plastic material. Such a layer will prevent the creation of short-circuiting paths through the body of the container to the material supported thereby.

The numeral 46 denotes a container which is made of a ceramic material impregnated with conductive particles. Those particles could be of metal, such as nickel, or could be of a non-metal such as carbon. Sufficient quantities of the embedded particles will be used to render the container semi-conductive, but the quantity of particles must not be so great that the resistive effect of the container 46 is negligible. Placing this container in register with two spaced conductors will enable that container to generate heat. As in the case of the container 44 it will be possible to vary the overall heating of the container 46 by regulating its position relative to the spaced conductors. A thin insulating glaze 47 will be formed on the upper surface of container 46.

The numeral 48 generally denotes a service plate such as a saucer. This service plate has upstanding sides 50 of varying inclination. The upstanding sides 50 of the service plate 48 coact with the supporting surface 51 of that plate to define a cusped line 52. This line approaches the periphery of the service plate 48 at three points and then moves inwardly from that periphery between those three points. The varying inclination of the upstanding sides 50 provides a variable degree of concavity for the service plate 48; that concavity being sharpest at the points where the cusped line approaches the periphery of the service plate 50 and being the mildest at the points between those points.

Three terminals 54, 56 and 58 form a part of the supporting surface 51 of the container 48. Those terminals are connected to terminals 62, 64 and 60 on the bottom of the container 48 by conductors 66, 68 and 70. The terminals 62, 64 and 60 are disposed directly below the terminals 54, 56 and 58 but only one of the conductors, namely conductor 66, extends directly down from the upper conductor to the lower conductor. The conductors 68 and 70 extend through the body of the service plate 48 and connect terminals which are not in register with each other. For example, the conductor 68 extends downwardly from the terminal 56 to the terminal 62 while the conductor 70 extends downwardly from the terminal 54 to the terminal 64. The terminals 62, 64 and 60 coact with the conductors 66, 68 and 70 to place the terminals 54, 56 and 58 in electrical contact with spaced conductors. The pairing of the terminals 62, 64 and 60 will provide pairing of the terminals 54, 56 and 58 in the manner best shown by Fig. 10.

The numeral 72 generally denotes a container in the form of a cup. This container has three terminals 76, 78, and 80 on the bottom thereof and those terminals project downwardly from the plane of the bottom of the container 72. The three terminals 76, 78 and 80 are connected to the electrically resistive path 74 embedded in the body and side walls of the container 72. That electrically resistive path is shown diagrammatically in Figs. 11 and 12 by dotted lines. The portion of the path between terminals 76 and 80 will have a different resistance than will the portion of the resistive path between the terminals 78 and 80. Accordingly, selective pairing of the terminals 76, 78 and 80 will enable the user to obtain three different temperature values for the contents of the container 72.

A handle 82 is provided on the container 72 and that handle will be dimensioned so it will resist rotation of the container 72 relative to the service plate 48, as by striking the portions of the side walls 50 of the service plate 48 that extend inwardly from the sections of sharpest concavity. This interrelationship between the handle 82 of the container 72 and the upstanding side walls 50 of the service plate 48 is desirable since it facilitates the registration of the terminals 76, 78 and 80 of the container with the terminals 54, 56 and 58 of the service plate 48.

It would be possible to obtain three different temperatures of the contents of the container 72 by placing appropriate pairs of the terminals 76, 78 and 80 in engagement with two spaced conductors. However, to do so would involve the setting of the handle 82 at a position which would be awkward for the user. Any need for such an awkward setting of the container 72 is obviated by reason of the arrangement of the conductors 66, 68 and 70 in the service plate 48. The arrangement of the terminals and conductors of the service plate 48 is such that changing the pairing of the terminals on that service plate while maintaining the position of the container 72, as by lifting the container 72 up and then rotating the service plate 48, will provide the desired control of the temperature of the contents of container 72. In particular, one rate of heating can be supplied to the contents of container 72 by maintaining that container in the position shown in the drawing and by placing the terminals 54, 58 and 56 in contact respectively with the terminals 76, 78 and 80 of the container 72. If the terminals 64 and 60 on the bottom of the service plate 48 are then placed in register with spaced conductors, current will flow from the terminal 64 through the conductor 70 to the terminal 54 and into the terminal 76, through the full length of the electrically resistive path 74 to the terminal 78 and thence through terminal 58 and conductor 66 to the terminal 60. This will provide the lowest heating rate because the full length of the resistive path is across the conductors. If the container 72 is kept in the same position but the service plate 48 is rotated so the terminals 56, 54 and 58 are respectively in register with the terminals 76, 78 and 80 of the container 72 and so the terminals 62 and 60 of the service plate 48 are in engagement with the conductors, another heat value will be obtained. In such a case, current will flow through terminal 60, through conductor 66, through terminal 58, through terminal 80, through that part of the resistive path 74 which lies between the terminals 80 and 76, through terminal 76, through terminal 56 and through the conductor 68 to the terminal 62. The resistance of this portion of the path will be less than the resistance of the overall path and therefore more current will flow and a greater heating effect will result. If the container 72 is held in the same position while the service plate 48 is rotated so the terminals 58, 56 and 54 are respectively in contact with the terminals 76, 78 and 80 of the container 72 and so the terminals 62 and 64 of the service plate are in engagement with the conductors, yet another heat value will be attained. Heat will be generated as current flows through terminal 64, through conductor 70, through terminal 54, through terminal 80, through that portion of the resistive path 74 which lies between terminal 80 and terminal 78, through terminal 78, through terminal 56 and through conductor 68 and terminal 62. The resistance of this portion of the resistive path will be different from the resistance of the portion of the resistive path between terminals 76 and 80 and a different heat value will result. With this arrangement it is possible for the user to set the container 72 so the handle 82 is convenient to his hand and to keep that container in that position while adjusting the heat value desired for the contents of that container. The numeral 84 denotes the top of a table or counter. For simplicity of explanation, the phrase "table" is used herein to describe a counter, a table, a shelf or buffet on which food is placed prior to the time it is served, a tablecloth or the like. The top 84 has recesses therein which receive elongated conductors 86 and 88 which will be connected to a suitable source of low voltage, as for example a transformer with an output of approximately twelve volts. The top 84 also has a number of recesses which contain conductors 90 and 92 and 91 and 93. The upper portions of the conductors 86 and 88 will be below the top of the table but the upper portions of the conductors 90, 91, 92 and 93 will be flush with the upper surface of the top 84. The conductors 90 and 91 will be connected to conductor 86 and conductors 92 and 93 will be connected to conductor 88. A layer of insulating material 94 will be disposed in contact with the upper surface of the top 84, and that layer will have openings in register with the conductors 90—93. This layer of insulated material may be painted on or may be a layer of plastic which is cemented to the upper surface of the top 84 of the table. Since the voltages applied to the conductors 86 and 88 are low, it would be possible to have the conductors 86 and 88 at the upper surface of the top 84 and rely upon the layer 94 of insulation to avoid contact by persons sitting at the table with the conductors 86 and 88.

The insulating layer 94 extends upwardly above the upper surfaces of the conductors 90—93 and will space table utensils away from those conductors. This will avoid the formation of a short circuit path between the conductors 90 and 92 and the conductors 91 and 93. The conductors 90 and 92 will receive pairs of terminals such as 28 and 30, 30 and 32, or 28 and 32 of the container 20, will receive pairs of terminals such as 36 and 38, 38 and 40, and 36 and 40 of container 34; while the conductors 91 and 93 will receive pairs of terminals such as 62 and 64, 64 and 60, and 62 and 60 of service plate 48 or pairs of terminals such as 76 and 78, 78 and 80, and 76 and 80 of the container 72. In this way, the container for the principal course of the meal can be kept warm while the container for coffee, tea or cocoa is kept warm. The conductors 90—93 are formed with the configuration of the terminals of the containers 20, 34 and 72 as well as of the service plate 48. In this way, the likelihood of accidental contact between the conductors 90—93 and table utensils or hand is minimized.

The conductors 86, 88 and 90—93 could be formed on a tablecloth by use of metallic threads or by painting an admixture of metal particles and binder on to that tablecloth. Flexible connectors could then extend from the ends of the conductors 86 and 88 to the terminals of the source of voltage. The insulating layer 94 could be formed on the upper surface of the tablecloth by painting that tablecloth with a plastic or other insulating paint.

The numeral 96 denotes the top of a table and that top has recesses which receive spaced leads 98 and 100. That top also has recesses which receive the conductors 102—105. The conductors 102 and 103 are connected to conductor 100 while the conductors 104 and 105 are connected to the lead 98. A layer 106 of insulated material is in engagement with the upper surface of the top 96, and that layer has two circular openings 108 and 110 therethrough. The opening 108 is in register with the conductors 102 and 104, and the opening 110 is in register with conductors 103 and 105. These openings will permit containers such as containers 44 and 46 to be placed in engagement with the conductors 102 and 104 and with the conductors 103 and 105. The openings 108 and 110 are preferably larger than the bottoms of 44 and 46 so the positions of those conductors can be varied. The variation in the position of the containers 44 and 46 is desirable for the reasons outlined above. The conductors 102 and 104 and the conductors 103 and 105 are preferably made in some ornamental form, one such form being shown.

In using the containers and tables provided by the present invention it is only necessary to connect a source of low voltage to the conductors on the table and to place the containers in register with those conductors. Where food is not to be heated, it will be placed in containers which are not equipped with electrically resistive paths and such containers can be superimposed upon the conductors without any heating effect. However, when food is to be heated, the container shown herein will be used and will be set to provide the desired amount of heat for the food.

Whereas several preferred embodiments of the present invention have been shown and described in the drawing and accompanying description it should be apparent to those skilled in the art that various changes may be made in the form of the invention without affecting the scope thereof.

What I claim is:

1. The combination of a table, a plurality of electrical conductors on said table and a container for food that has been cooked and that is to be kept warm for eating purposes, said table having a top that is substantially plane, said conductors being a part of the top of the table and having the upper surfaces exposed at substantially the level of said plane, said conductors being spaced apart, said container having a food confining surface and an electrically resistive path that generates heat whenever current passes through it, and terminals, said path being spaced from but being in heat-transferring relation with said food confining surface, said terminals being spaced apart and being electrically connected to said path, said terminals being exposed at the lower surface of the container and spaced to engage said conductors solely by face to face gravity induced contact, the conductors comprising flat surfaces and the relative areas of the conductors and terminals being substantially different whereby the container may be slidably moved relative to the surface of the table in a plane substantially parallel to said surface.

2. The combination of a table, a plurality of electrical conductors on said table, and a container for food that has been cooked and that is to be kept warm for eating purposes, said table having a top that is substantially plane, said conductors being a part of the top of said table but having the exposed upper surfaces disposed below the level of said plane, said conductors being spaced apart, said container having a food confining surface and an electrically resistive path that generates heat whenever current passes through it, and terminals, said path being spaced from but being in heat-transferring relation with said food-confining surface, said terminals being spaced apart and being electrically connected to said path, said terminals being registerable with said conductors and being freely movable laterally of said conductors while maintaining gravity-induced electrical contact with said conductors, said container having a bottom that is substantially plane, said terminals extending downwardly below the plane of said bottom and below the level of said plane of said top of said table to engage the upper surfaces of said conductors, said terminals being three in number, the spacing between said three terminals being equal and being the same as the spacing between said conductors.

3. A container for materials that are to be kept warm and that comprises a food-confining surface, an electrically resistive path that generates heat whenever current passes through it, said path being spaced from but being in heat-transferring relation with said food-confining surface, a terminal connected to one end of said path, a second terminal connected to said path intermediate the ends of said path, a third terminal connected to the other end of said path, a service plate that is adapted to underlie and support said container and to transmit current to said terminals, three terminals on the upper surface of said service plate that are registerable with the said terminals on said container, said terminals on the upper surface of said service plate being successively spaced, three terminals on the bottom of said service plate, said terminals on the bottom of said service plate being successively spaced, a conductor connecting the first terminal on the upper side of said service plate with the first conductor on the bottom of said service plate, a second conductor connecting the second terminal on the upper side of said service plate with the third terminal on the bottom of said service plate, and a third conductor connecting the third terminal on the upper side of said service plate with the second terminal on the bottom of said service plate, said container being movable relative to said service plate to interconnect the terminals on said container to the bottom terminals on said service plate in different arrangements.

4. A container for materials that are to be kept warm and that comprises a material-supporting surface, an electrically resistive path that generates heat whenever current passes through it, said path being spaced from but being in heat-transferring relation with said material-supporting surface, a terminal connected to one end of said path, a second terminal connected to said path intermediate the ends of said path, a third terminal connected to the other end of said path, a service plate, three terminals on the upper surface of said service plate that are registerable with the said terminals on said container, said terminals on the upper surface of said service plate being successively spaced, three terminals on the bottom of said service plate, said terminals on the bottom of said service plate being successively spaced, a conductor connecting the first terminal on the upper side of said service plate with the first conductor on the bottom of said service plate, a second conductor connecting the second terminal on the upper side of said service plate with the third terminal on the bottom of said service plate, and a third conductor connecting the third terminal on the upper side of said service plate with the second terminal on the bottom of said service plate, and interacting surfaces on said container and service plate to resist rotation of said container relative to said service plate.

5. A container having a food supporting surface that is to be kept warm comprising an electrically resistive path that generates heat whenever current flows through it, carried by said container, said path being spaced from but in heat transferring relation to said surface, and terminals, said terminals being spaced apart and being electrically connected to said path, said container having a bottom, said bottom being provided with at least three of said terminals, which are exposed at the exterior surface of said bottom and the connection between said terminals and path being such as to permit variable rate of heating of the container depending upon the terminals used.

6. A container having a food supporting surface that is to be kept warm comprising an electrically resistive path that generates heat whenever current flows through it, carried by said conatiner, said path being spaced from but in heat transferring relation to said surface, and terminals, said terminals being spaced apart and being electrically connected to said path, said container having a bottom, said bottom being provided with at least three of said terminals, which are exposed at the exterior surface of said bottom and the connection between said terminals and path being such as to permit variable rate of heating of the container depending upon the terminals used, said terminals being adjacent the periphery of said container to minimize the likelihood of said container being tipped during use, said electrically resistive path being a thin conductive coating on said exterior surface of said bottom.

References Cited in the file of this patent
UNITED STATES PATENTS

| | | |
|---|---|---|
| 474,398 | Mitchell | May 10, 1892 |
| 535,072 | O'Neill | Mar. 5, 1895 |
| 678,522 | Seips | July 16, 1901 |
| 1,030,036 | Waage et al. | June 18, 1912 |
| 1,053,280 | Copeman | Feb. 18, 1913 |
| 1,318,554 | Harth | Oct. 14, 1919 |
| 1,393,751 | Chapin | Oct. 18, 1921 |
| 1,469,626 | Dorsey | Oct. 2, 1923 |
| 1,801,538 | Briscoe | Apr. 21, 1931 |
| 2,046,200 | McArdle | June 30, 1936 |
| 2,182,383 | Lang et al. | Dec. 5, 1939 |
| 2,190,225 | Vollmer | Feb. 13, 1940 |
| 2,269,689 | Reichold | Jan. 13, 1942 |
| 2,448,388 | Plummer | Aug. 31, 1948 |
| 2,532,014 | Davis | Nov. 28, 1950 |
| 2,563,875 | Salton | Aug. 14, 1951 |
| 2,603,740 | Del Buttero | July 15, 1952 |
| 2,609,478 | Crawford et al. | Sept. 2, 1952 |
| 2,611,069 | Frazier | Sept. 6, 1952 |

FOREIGN PATENTS

| | | |
|---|---|---|
| 6,795 | Norway | Nov. 21, 1898 |
| 9,158 | Great Britain | June 22, 1915 |
| 89,015 | Switzerland | Apr. 16, 1921 |
| 296,030 | Great Britain | Aug. 23, 1928 |